Jan. 4, 1927. 1,613,288
E. NIKSIC
TROLLEY REEL CASING
Filed June 21, 1926
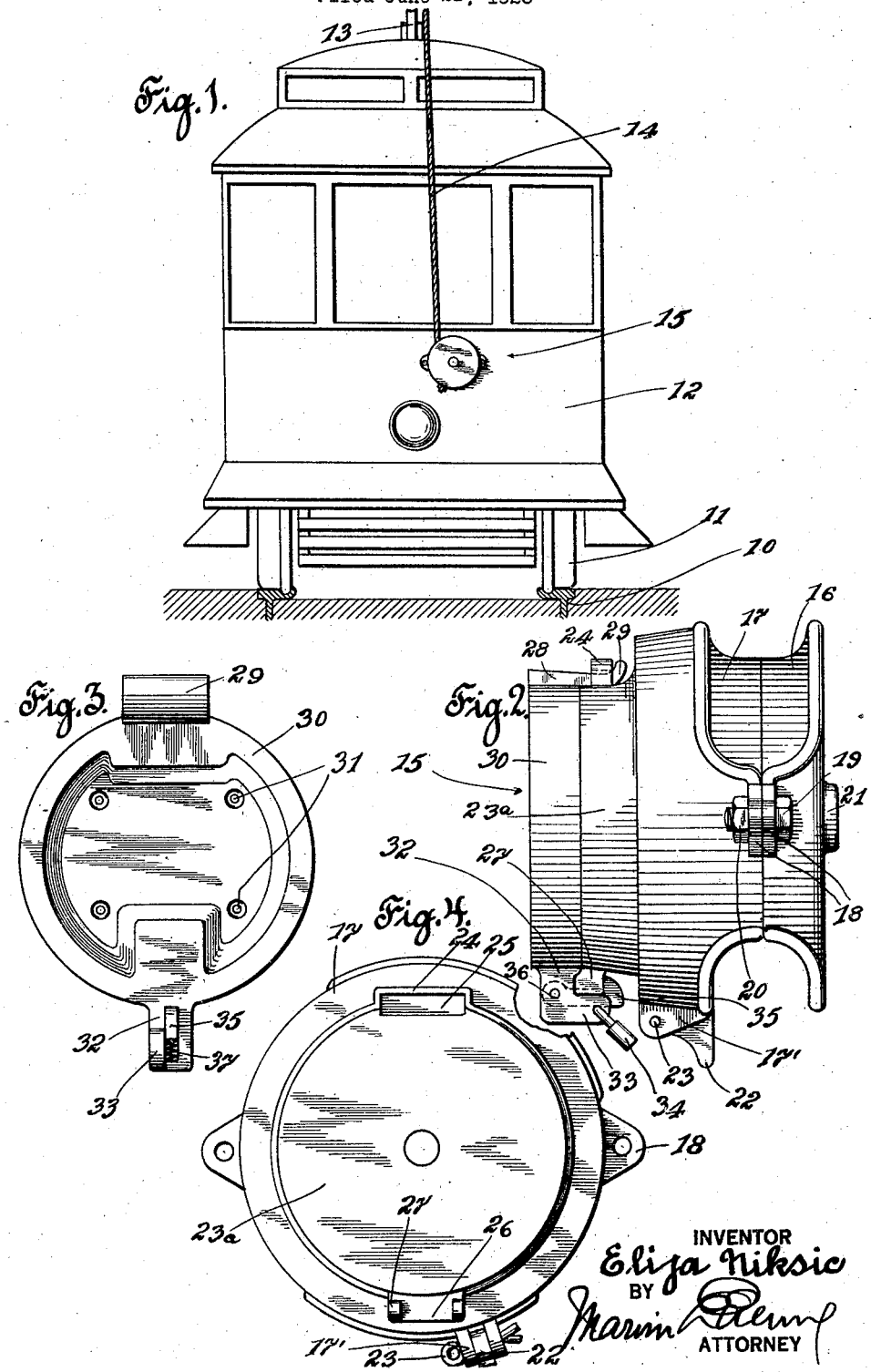
INVENTOR
Eliza Niksic
BY
ATTORNEY Patented Jan. 4, 1927.

1,613,288

UNITED STATES PATENT OFFICE.

ELIJA NIKSIC, OF PORT RICHMOND, NEW YORK.

TROLLEY-REEL CASING.

Application filed June 21, 1926. Serial No. 117,270.

This invention relates to casings and more particularly to such housings as are adapted to accommodate trolley reels.

One of the objects of this invention is to provide a novel mode of securing a reel casing to a conventional trolley car.

Another object is in the provision of means to lock the housing to a conveyance thus preventing the unauthorized removal of the same.

A further aim is to produce a trolley reel frame having means whereby a portion of a broken cable may be removed for repairing without having to disengage the entire device.

These and other objects are accomplished by the novel construction, combination and arrangement of parts hereinafter described and illustrated in the accompanying drawing, in which:—

Figure 1 is a front elevational view of a conventional trolley car, showing the application of the invention disclosed herein.

Figure 2 is a side elevational view of the entire reel casing, drawn to an enlarged scale, and showing the details thereof.

Figure 3 is a front elevational view of the plate member secured to the car, drawn to an increased scale.

Figure 4 is a rear elevational view of the housing containing the reel, drawn to an enlarged scale.

Referring more in detail to the drawing:—

The numeral 10 generally designates a trackway on which is guided wheels 11 supporting an ordinary trolley car 12 having on the roof thereof, a trolley pole 13 at the top of which is mounted a conventional roller contact, not shown, engaging a "thirdrail". The upper end of the pole 13 has secured to it a cable 14, the other end of which is wound on a spring actuated reel mounted in a casing 15.

The casing 15 consisting of a pair of hollow cylindrical members 16 and 17, front and rear respectively, having formed therewith two pairs of lugs 18, one on each side through which pass bolts 19 secured by nuts 20.

The outer member 16 has formed in its front surface, a bearing 21 in which is journalled a spring actuated reel, not shown, on which is wound the free end of the cable 14, parts of the member 16 and 17 being cut away and beaded to present an opening for the cable.

Formed on the lower side of the member 17 is a fork 17' in which is pivoted a pawl 22 on a cotter pin 23, the pawl reaching within the casing to engage the reel in an obvious manner and so permit a definite amount of the cable 14 to be unwound for repairs, thus eliminating the entire casing.

The member 17 is reduced at 23ª and has at its upper end a bracket 24 presenting a space 25 in which is engageable the curved free end 29 of a catch bar 28 formed on a circular plate 30 fixed to the front of a surface car by any preferred means engaging through openings 31 in the plate.

Formed on the lower end of the plate 30 is a downwardly extending slotted element 32 having at right angles thereto, an inreaching lug 33.

Pivoted in the slot of the element 32 by a pin 36, is a dog 35 engaging a flat downwardly extending element 26 between a fork 27 formed integrally with the member 23ª, the dog being locked into position by a padlock 34 engaging through an opening beneath the dog 35 and in the lug 33.

The dog 35 is normally held upward by the expanding action of a spring 37 secured in the slot formed in the element 32.

Thus it may be seen that to remove the reel casing, it is merely necessary to displace the pad-lock 34, depress the dog 35 from engagement with the element 26 and then disengage the bar 28 from the bracket 24, the flat plate 30 remaining permanently secured to its supporting surface.

From the foregoing it may be seen that a simple and novel device has been disclosed that in every way fulfills the purposes for which it is intended.

Having thus described my invention, what I claim as new and desire to secure by Letters Patent, is:—

1. A trolley reel casing comprising a pair of hollow members secured to each other, a bearing in one of said members in which a reel may be journalled, a circular plate secured to a permanent surface, a curved catch bar on said plate, a bracket on one of said hollow members engageable with said bar, and means by which said hollow members and plate are lockingly engageable with each other.

2. A trolley reel casing comprising a pair of hollow members, lugs on said members by which said members are engageable with each other, a bracket on one of said members, a catch bar engageable therewith formed on a plate permanently secured to a supporting surface, lugs formed on said plate, a dog pivoted intermediate said lugs, said dog being engageable with a downwardly extending element on one of said hollow members, and means engageable in said lugs to lock said dog into position.

In witness whereof I have affixed my signature.

ELIJA NIKSIC.